United States Patent Office 3,446,209
Patented May 27, 1969

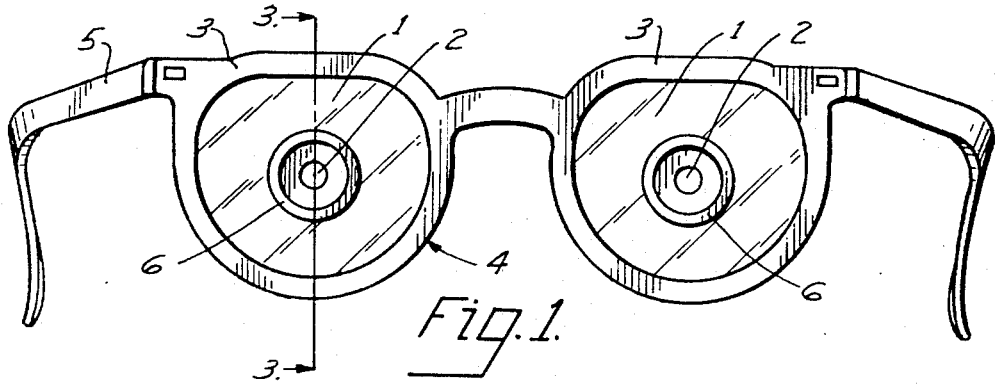
Fig. 1.
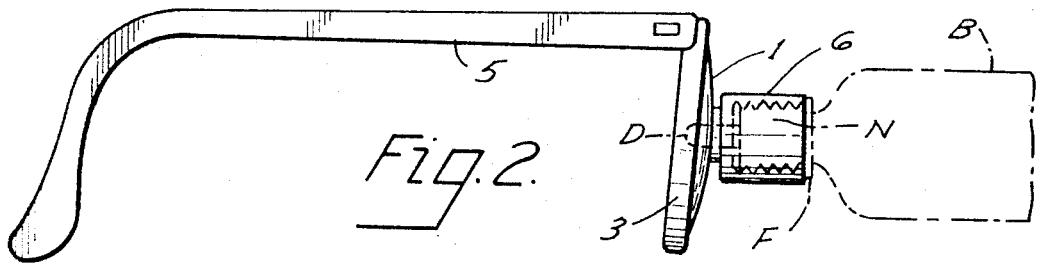
Fig. 2.
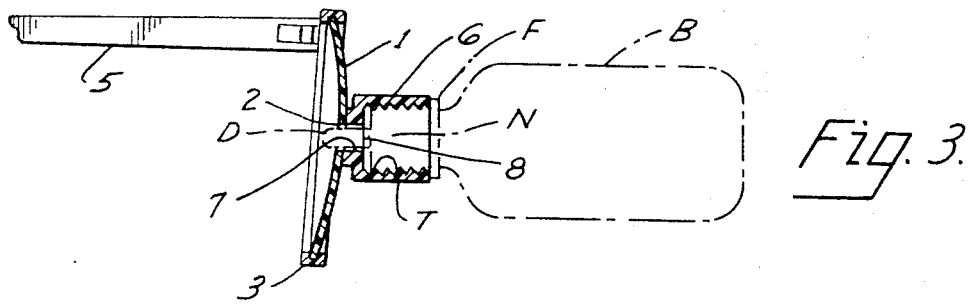
Fig. 3.
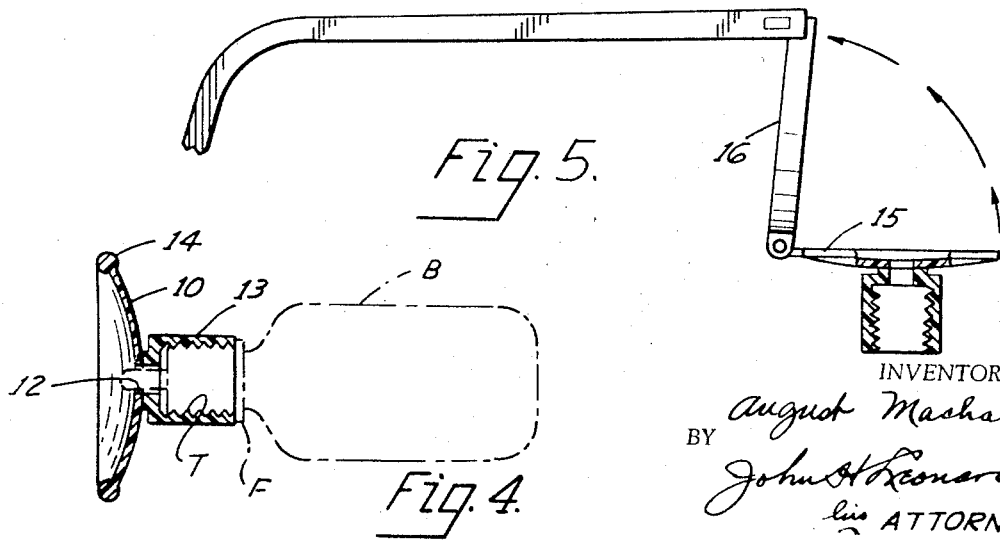
Fig. 5.
Fig. 4.
INVENTOR.
August Macha,
BY John H. Leonard,
his ATTORNEY.

3,446,209
DEVICE FOR FACILITATING SELF-INTRODUCTION OF MEDICINAL DROPS IN EYES
August Macha, 12019 Browning Ave.,
Cleveland, Ohio 44120
Filed Apr. 7, 1966, Ser. No. 540,946
Int. Cl. A61m *35/00*
U.S. Cl. 128—233                     4 Claims

ABSTRACT OF THE DISCLOSURE

The device comprises a shield with positioning means thereon which engage the head of a user, exclusive of the eye of the user, and position the shield in forwardly spaced aligned relation to the eye but out of contact therewith. The shield carries a guide which detachably engages and holds a medicinal eyedropper in alignment with, and directed toward, the center of the exposed eyeball, and with its discharge end close to, but spaced forwardly from, the surface of the eyeball. The positioning means may be a spectacle frame worn in the usual manner or it may be a rim on the shield which engages the head in the general region of the eye socket entrance.

---

This invention relates to a device for facilitating the self-introduction into the eye of the user of medicinal drops dispensed by a medicinal eye dropper.

It has long been recognized that the self-introduction into the eye of the user of medicinal drops from a dispensing dropper is an annoying operation. Consequently, another person is frequently called on for assistance to this end. The difficulty is due largely to the normal involuntary reaction of the user, as the dropper closely approaches his eye, to avoid contact of the eye with the end of a dispenser. As the dropper nozzle approaches the eye closely, the reaction is to close the eye, draw the head back away from the approaching dropper or turn the head to one side.

Furthermore, as the eye dropper nozzle closely approaches the eye, even one who can keep his eye open and directed at the nozzle finds that the nozzle is out of focus so that he cannot determine the proximity and position of the nozzle relative to the eyeball. Therefore, he becomes nervous and as a result the positioning and steadying of the dropper during dispensing are erratic.

For self-introduction of the drops, usually the dropper must be supported in position, held steady, and operated by one hand so that the other hand is free to hold back the lid of the eye. This is true particularly when some foreign particle has entered the eye and it is necessary to hold the lid widely open while flooding the pocket between the lid and eye with drops.

All of these operations, of course, are performed with the head thrown back in a forced position so that the face faces directly upwardly and the drops can drop into the eye by gravity.

Experience has proven that people living alone, or having no one readily available to help them, forego putting drops in their eyes because of the inconvenience and discomfiture of doing so with the result that the therapy recommended by the eye doctor is not followed fully.

In accordance with the present invention, a device is provided whereby the medicinal dropper, whether it be the ordinary glass tube and bulb eye dropper of the type which is filled from a bottle, or whether it be in the form of a dispensing squeeze bottle with an integral dispensing nozzle, can be placed manually in proper position relative to the eye while the head is thrown back and facing upwardly, held steady in that position so as to assure that the drops drop into the eye, and, at the same time, to assure that the nozzle of the dropper itself does not come in contact with the eye.

The device may be thus positioned, the medicinal dropper engaged therewith and guided thereby, the device and eye dropper held steady, and the latter manipulated to dispense drops, all by one hand of the operator while leaving the other hand free to pull back the eyelid to facilitate entry of the drops.

Various specific advantages will become apparent from the following description wherein reference is made to the drawings, in which:

FIG. 1 is a front elevation of a preferred form of a device embodying the principles of the invention, the device there illustrated being particularly adapted for self-introduction of drops into both eyes;

FIG. 2 is a side elevation of the device illustrated in FIG. 1;

FIG. 3 is a fragmentary vertical sectional view of the device and is taken on the line 3—3 of FIG. 1; and FIG. 4 is a modification of the device.

Referring to the drawings, the device comprises a guide and positioning which preferably is in the form of a relatively rigid, self-supporting apertured shield 1. It is desirable that the shield be concavo-convex. Preferably it is composed of one of the transparent or translucent synthetic plastics, such as Lucite or the like, the specific material being relatively unimportant.

The shield has a central aperture 2 spaced from a periphery of the shield and so arranged that when the shield is aligned with the eye in forwardly spaced relation thereto, the aperture is substantially in line with the iris of the eye when the eye is looking straight forwardly. The shield is provided at its periphery with positioning means which, in the form illustrated in FIG. 1, is in the form of a rim 3, such as provided in spectacle frames. The rim 3 may be of such size that it can engage the head, in a general region of the periphery of the eye socket entrance and thereby space the shield 1 the desired distance in front of the eye and hold it in the proper position transversely of the eye.

Frequently one wishes to treat both eyes, in which case the positioning and guide means may comprise two such shields 1, these shields being mounted in the two openings in conventional spectacle frame, indicated generally at 4.

Thus the positioning portion of the guide and positioning means can be simply a single rim 3, integral with or connected to the shield 1. In such case, the device is pressed against the regions of the head surrounding the entrance to the eye socket.

One the other hand, templates 5 can be provided on the frame 4 and made to fit sufficiently snugly to hold the entire frame 4 in place. In the latter case, the entire frame 4 and the templates 5 become the positioning portion of the guiding and positioning means.

The device is designed to hold the shield 1 with its rear face spaced sufficiently far in front of the eyeball so that, when the nozzle of the eye dropper is inserted in the aperture 2 to its full axial extent, the end of the nozzle is assuredly spaced a safe distance from, and out of contact with, the eyeball. This is necessary not only from the safety standpoint but also from the psychological standpoint, as a very substantial clearance is more reassuring to the user. The shield, therefore, is mounted with its convex face forwardly, thus assuring clearance even should the rim 3 engage the head.

Generally, the aperture 2 is sufficient for guiding and steadying the squeeze bottle or dropper when the nozzle of the squeeze bottle or dropper is disposed therein. However, if desired, a socket 6 may be provided. The socket 6 is in the form of a forwardly open cup having its base bonded or otherwise attached, to the forward face of the shield 1. The socket 6 has, in its bottom wall, an aperture 7 which may be coextensive and coaxial with the aperture 2 and of a diameter to receive the nozzle. A stop shoulder 8 is provided in surrounding relation to the aperture 7.

Generally, present day eye droppers are in the form of dispensing squeeze bottles. One such squeeze bottle is indicated in dot-dash lines in FIGS. 2 and 3. Such a bottle B may be composed of polyethylene or other resilient plastic material and can be squeezed for dispensing the contents. The bottle usually has a reduced neck N on the forward end of which is a discharge nozzle D having a forwardly directed aperture connected with the interior of the bottle. Generally, a flange F is provided a predetermined distance away from the base of the nozzle, and the neck end is provided with threads T for cooperation with the threads of a conventional sealing cap.

The socket 6 may be internally threaded so that the threads T of the neck N of the bottle can be placed in threaded engagement therewith, or it may be smooth and unthreaded so that the threaded neck N can be slid therein without rotation about the neck axis.

The internal shoulder 8 of the socket 6 is positioned for engaging the forward end of the neck adjacent the base of the nozzle D. This positioning may be such that the nozzle D projects through, and very slightly beyond, the rear face of the shield 1.

Thus, a user can place the guiding and positioning means in an operating position in the normal manner of putting on spectacles, lean the head backwardly, insert the neck of the squeeze bottle fully into the socket 6, and then dispense the drops, as desired. In doing so, one hand can be used for dispensing and the other for reaching with one finger under the rim 3 and pulling back the eyelid to better expose the eyeball. On the other hand, for feeble people who may have difficulty in performing this operation, the socket employing internal threads can be employed. In such a case, the squeeze bottle neck may be screwed into place in the socket before putting on the spectacles. After the spectacles are put on, all that is necessary is to hold the eyelid back with a finger of one hand and squeeze on the bottle with the other hand without attempting to hold the bottle in any particular alignment.

In many instances it is desirable to have a more compact structure which can be readily carried about and disposed of without appreciable loss. For this purpose the modification shown in FIG. 4 is employed. As therein shown, the positioning and guiding means comprises a shield 10 which preferably is concavo-convex with the convex side being the forward face. The shield 10 has a central aperture 12, corresponding to the aperture 2 in FIGS. 2 and 3, and, if desired, may be provided with a socket 13, corresponding to the socket 6. The positioning means in the case of such a monocular shield, is usually a thickened integral peripheral rim 14, but it may be merely the peripheral bead or edge of the shield, is rounded and made smooth so that it cannot cause discomfort when placed against the portions of the head surrounding the entrance to the eye socket. The socket may be internally threaded so that the dispensing dropper or bottle may be screwed into the socket 13, thereby providing, in effect, a unitary structure for placing against the head in overlying spaced relation to the eyeball. Such a device can be positioned and held steadily in place with one hand, the rim of the shield being pressed lightly against the head by manual pressure exerted endwise on the squeeze bottle. A finger of the other hand is left free for holding back the eyelid and squeezing on the bottle.

The modification shown in FIG. 4 has the advantage in that it can be made of very inexpensive materials, can be sold with the squeeze bottle as a disposable item, and can be stored readily in a small kit with the squeeze bottle.

In some instances, when the socket such as 6 or 13 is not used, if the shield is transparent or translucent, an opaque band may be painted on the forward face of the shield in surrounding relation to the aperture therein. This assists the insertion of the nozzle. Generally, however, this is not necessary.

If desired, as indicated in FIG. 5, a shield 15, such as the shield 1, may be hinged to a spectacle frame 16 so that the shield can be swung downwardly leaving the eye totally uncovered. While the shield is in the downward position, with the open end of the socket facing downwardly, the nozzle of the squeeze bottle or dropper, held in upright position, can be inserted in the socket. When the nozzle is fully seated, the bottle and shield 15 can be swung upwardly about the hinge connection into proper position in front of the eye.

Having thus described my invention, I claim.

1. A device for facilitating the self-introduction of medicinal drops into the eye of a user by means of a medicinal eye dropper and comprising:

an eye dropper having a discharge nozzle;

guide means;

positioning means on the guide means and having portions extending laterally outwardly beyond the lateral limits of the guide means and being of a size and shape so as to engage in a predetermined position with a portion of the head spaced from the eye of the user and when in said predetermined position, it constrains the guide means to, and steadies the guide means in, a position in forwardly spaced relation to, and in alignment with, the eye of the user; and said guide means detachably engaging said medicinal eye dropper and being positioned in relation to the positioning means so that, when the positioning means are in said predetermined position relative to said head portion, and the guide means are in said predetermined engagement with the dropper, the guide means position and steady the dropper with the discharge end of said nozzle in forwardly spaced, but close, relation to the center portion of the exposed surface of the eyeball of the user in a position for dropping drops onto said center portion when the face of the user is upturned;

the guide means including a relatively wide shield having a closed curvilinear periphery and having a forward face and a rear face which is disposed in face to face spaced relation in front of the eye when the positioning means is in said predetermined position against said head portion, and having a small central aperture in spaced relation to the margins of said faces;

said guide means further including a rigid socket member carried by the shield at, and extending forwardly from the forward face of the shield and having a socket in communication at its rearward end with the aperture and open at its forward end, and detachably engaging a portion of the dropper spaced from the nozzle and positioning the nozzle of the dropper in the aperture and constraining the dropper from displacement laterally of the shield and in a position relative to the shield wherein the axis of the nozzle is substantially normal to the shield;

said socket member being arranged to limit movement of the dropper toward the shield aperture to a position in which the discharge end of the nozzle protrudes beyond the rear face of the shield toward, but terminates in spaced relation to, the eyeball;

said positioning means being on the periphery of the shield and having a portion disposed rearwardly from said rear face of shield to engage the head and position the shield, and thereby the nozzle, in said spaced relation in front of the eye and in relatively fixed position transversely of the eye socket.

2. The structure according to claim 1 wherein the positioning means includes a spectacle frame, and the apertured shield is mounted on the spectacle frame.

3. The structure according to claim 2 wherein two apertured shields are provided and are mounted on the spectacle frame so as to be disposed in front of the eyes, respectively, when the frame is in place on the head of the user.

4. The structure according to claim 2 wherein holding templates are connected to the spectacle frame and hold the frame in operating position on the head.

References Cited

UNITED STATES PATENTS

| | | | |
|---|---|---|---|
| 2,898,911 | 8/1959 | Taylor | 128—249 |
| 3,016,898 | 1/1962 | Erwin | 128—249 |
| 3,058,466 | 10/1962 | Rootsong | 128—233 |
| 772,028 | 10/1904 | Carpenter | 128—260 |
| 1,437,435 | 12/1922 | Maier | 128—249 |
| 2,475,522 | 7/1949 | Scherkenbach | 351—45 X |
| 2,482,431 | 9/1949 | Okawa | 128—233 |
| 3,252,747 | 5/1966 | Robins | 351—59 |
| 3,279,466 | 10/1966 | Mings | 128—233 |

RICHARD A. GAUDET, *Primary Examiner.*

JOHN D. YASKO, *Assistant Examiner.*

U.S. Cl. X.R.

128—249; 351—41, 158.